United States Patent
Zuo et al.

(10) Patent No.: US 10,579,853 B2
(45) Date of Patent: Mar. 3, 2020

(54) METHOD AND APPARATUS FOR ACQUIRING FINGERPRINT IMAGE AND TERMINAL DEVICE

(71) Applicant: SHENZHEN GOODIX TECHNOLOGY CO., LTD., Shenzhen (CN)

(72) Inventors: Yong Zuo, Shenzhen (CN); Bing Wang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 244 days.

(21) Appl. No.: 15/793,972

(22) Filed: Oct. 25, 2017

(65) Prior Publication Data
US 2019/0057237 A1 Feb. 21, 2019

Related U.S. Application Data

(63) Continuation of application No. PCT/CN2017/098001, filed on Aug. 18, 2017.

(51) Int. Cl.
*G06K 9/00* (2006.01)
*G06K 9/22* (2006.01)

(52) U.S. Cl.
CPC .......... *G06K 9/0004* (2013.01); *G06K 9/001* (2013.01); *G06K 9/0008* (2013.01); *G06K 9/22* (2013.01); *G06K 2009/0006* (2013.01)

(58) Field of Classification Search
CPC .... G06K 9/0004; G06K 9/0008; G06K 9/001; G06K 2009/0006
USPC .......................................................... 382/125
See application file for complete search history.

(56) References Cited

U.S. PATENT DOCUMENTS

| | | | |
|---|---|---|---|
| 2004/0228508 | A1 | 11/2004 | Shigeta |
| 2005/0281475 | A1 | 12/2005 | Wilson |
| 2008/0193043 | A1 | 8/2008 | Wilson |
| 2009/0262070 | A1 | 10/2009 | Wilson |

(Continued)

FOREIGN PATENT DOCUMENTS

| | | |
|---|---|---|
| CN | 104598899 A | 5/2015 |
| CN | 104680136 A | 6/2015 |

(Continued)

*Primary Examiner* — Amandeep Saini

(57) ABSTRACT

Embodiments of the present disclosure relate to a method and an apparatus for acquiring a fingerprint image and a terminal device. The method includes determining target light information of a light environment of a to-be-identified fingerprint; determining a target operating parameter corresponding to the target light information according to a correspondence between light information and operating parameters; and acquiring a first fingerprint image of the to-be-identified fingerprint according to the target operating parameter. According to the method and the apparatus for acquiring the fingerprint image and the terminal device of the embodiments of the present disclosure, the operating parameter used for a time when the fingerprint image of the to-be-identified fingerprint is acquired can be dynamically adjusted according to different light environments, so that an intended result of using an optical fingerprint in different environments is achieved without increasing hardware cost.

14 Claims, 2 Drawing Sheets

(56) References Cited

U.S. PATENT DOCUMENTS

| | | |
|---|---|---|
| 2012/0169673 A1 | 7/2012 | Wilson |
| 2014/0286544 A1* | 9/2014 | Yi .................... G06K 9/00013 382/124 |
| 2015/0002735 A1* | 1/2015 | Moskovchenko ... H04N 5/2354 348/370 |
| 2017/0078542 A1 | 3/2017 | Moskovchenko |
| 2017/0344846 A1* | 11/2017 | Yoshida ................ A61B 5/117 |
| 2017/0366715 A1 | 12/2017 | Moskovchenko |
| 2018/0032783 A1* | 2/2018 | Wu ........................ G06F 3/041 |

FOREIGN PATENT DOCUMENTS

| | | | |
|---|---|---|---|
| CN | 105959592 A | 9/2016 | |
| EP | 1608157 A2 | 12/2005 | |
| KR | 20050048511 A | 5/2005 | |
| WO | WO-2017031841 A1 * | 3/2017 | ............. G06F 3/041 |

* cited by examiner

METHOD AND APPARATUS FOR ACQUIRING FINGERPRINT IMAGE AND TERMINAL DEVICE

CROSS-REFERENCE TO RELATED APPLICATIONS

The present application is a continuation of international application No. PCT/CN2017/098001 filed on Aug. 18, 2017, of which is hereby incorporated by reference in its entirety.

TECHNICAL FIELD

The present disclosure relates to the field of biometric identification technologies, and in particular, to a method and an apparatus for acquiring a fingerprint image and a terminal device.

BACKGROUND

At present, in a terminal device with an optical fingerprint device arranged under a screen, when a finger presses on the screen which is emitting light, the optical fingerprint device constructs a fingerprint image by signal strengths of reflected light resulting from valleys and ridges of the finger. However, the optical fingerprint device is susceptible to be influenced by environment during fingerprint collection, for example, when the terminal device is in a bright environment a signal exceeds a detection range of the fingerprint device and valid fingerprint image data may not be obtained; when the terminal device is in a relatively dark environment, intensities of light reflected by the valley and the ridge may tend to be consistent, so that the valid fingerprint image data may not be obtained either.

SUMMARY

The present disclosure provides a method and an apparatus for acquiring a fingerprint image and a terminal device, which may effectively acquire fingerprint image data.

According to a first aspect, a method for acquiring a fingerprint image is provided, the method includes: determining target light information of a current light environment of a to-be-identified fingerprint; determining a target operating parameter corresponding to the target light information according to a correspondence between light information and operating parameters, the operating parameter being a parameter used when a fingerprint image is acquired to perform a fingerprint identification; and acquiring a first fingerprint image of the to-be-identified fingerprint according to the target operating parameter.

Therefore, in the method for acquiring the fingerprint image according to an embodiment of the present disclosure, a corresponding operating parameter may be determined according to light information of a light environment of a to-be-identified fingerprint, and a fingerprint image of the to-be-identified fingerprint is acquired according to the operating parameter so as to execute the fingerprint image identification. In this way, a related operating parameter for acquiring the fingerprint image of the to-be-identified fingerprint can be dynamically adjusted according to different light environments, so that an intended result of using an optical fingerprint in different environments is achieved without increasing hardware cost.

It should be understood that the method may be executed by an apparatus for acquiring a fingerprint image, the apparatus may be a terminal device, and the apparatus may include a light source device and an optical fingerprint module. Specifically, the method may be executed by the optical fingerprint module, and the optical fingerprint module is configured to perform a fingerprint identification on a to-be-identified fingerprint, for example, the fingerprint identification is performed according to a first fingerprint image; the light source device is configured to provide a light source when the optical fingerprint module performs the fingerprint identification.

It should be understood that the light in the light environment may include natural light in the environment where the to-be-identified fingerprint is located, or may include the light source provided by the light source device in an optical fingerprint identification device.

It should be understood that the target light information may characterize an intensity of the light of the to-be-identified in the current light environment. The target light information may include any parameter that characterizes the intensity of the light of the to-be-identified in the current light environment.

For example, before a fingerprint identification is performed on the to-be-identified fingerprint, an image of the current light environment is firstly collected, where the image is a non-fingerprint image, a pixel value of the image is calculated, and the light in the current light environment is characterized by the pixel value of the image, that is, the target light information includes the pixel value of the image.

With reference to the first aspect, in an implementation manner of the first aspect, determining the target light information of the current light environment of the to-be-identified fingerprint, includes: in the current light environment, acquiring a second fingerprint image of the to-be-identified fingerprint according to a preset exposure time; determining a pixel value of the second fingerprint image; and determining the light information, the light information including the pixel value of the second fingerprint image.

It should be understood that the preset exposure time can be set as any duration, such as 10 ms, criteria of setting the preset exposure time may be such that the pixel value of the second fingerprint image is less than or equal to a second preset pixel value.

With reference to the first aspect and the foregoing implementation manner, in another implementation manner of the first aspect, determining the pixel value of the second fingerprint image, includes: determining pixel values of all pixel points in the second fingerprint image; and determining an average pixel value of all the pixel points as the pixel value of the second fingerprint image.

It should be understood that determining the pixel value of the second fingerprint image may include: determining a pixel value of each of all the pixel points of the second fingerprint image, determining the average value of the pixel values of all the pixel points as the pixel value of the second fingerprint image, or the pixel value of the second fingerprint image is calculated by another algorithm.

Optionally, in view of an effect of the second fingerprint image, the pixel value of the second fingerprint image may be determined by determining a pixel value of a partial area of the second fingerprint image.

With reference to the first aspect and the foregoing implementation manners, in another implementation manner of the first aspect, acquiring the second fingerprint image of the to-be-identified fingerprint, includes: acquiring an image of a partial fingerprint of the to-be-identified fingerprint as the second fingerprint image.

It should be understood that the second fingerprint image of the to-be-identified fingerprint may be an entire fingerprint image of the to-be-identified fingerprint, also may be an image of the partial fingerprint of the to-be-identified fingerprint.

With reference to the first aspect and the foregoing implementation manners, in another implementation manner of the first aspect, the method further includes: determining light information and a corresponding operating parameter of each of a plurality of light environments; and establishing a correspondence between the light information and the operating parameter of each of the light environments.

It should be understood that the correspondence between the light information and the operating parameters may be stored in the optical fingerprint identification device. For example, the optical fingerprint identification device may be the terminal device, and the correspondence between the light information and the operating parameters may be stored in a storage member of the terminal device, or the correspondence between the light information and the operating parameters is set in the fingerprint module in the optical fingerprint identification device.

It should be understood that the plurality of light environments are to simulate different intensities of the light in light environment in which the user may be located for the fingerprint identification. Furthermore, when determining the first light environment, the light source device in the optical fingerprint identification device may emit light or may not emit light. If the light source device emits light, the light in the first light environment simulates the light including the external natural light and the light of the light source device; and if the light source device does not emit light, the light in the first light environment merely simulates an influence of the external natural light on a fingerprint detection.

Optionally, the light information of the first light environment is determined, the light information may include at least one of intensity, brightness and luminance of the light in the first light environment, or the light information may also include another parameter that may characterize the intensity of the light in the first light environment, for example, a pixel value of an initial fingerprint image may be calculated by collecting the initial fingerprint image of a test fingerprint, and the light information includes the pixel value of the initial fingerprint image.

With reference to the first aspect and the foregoing implementation manners, in another implementation manner of the first aspect, the operating parameter includes an exposure time and the target operating parameter includes a target exposure time.

With reference to the first aspect and the foregoing implementation manners, in another implementation manner of the first aspect, determining the light information and the corresponding operating parameter of each of the plurality of light environments, includes: in a first light environment of the plurality of light environments, determining a pixel value of an initial fingerprint image of a test fingerprint according to a preset exposure time; determining light information of the first light environment, the light information of the first light environment including the pixel value of the initial fingerprint image; in the first light environment, determining corresponding pixel values of a plurality of fingerprint images of the test fingerprint according to different exposure times; determining an exposure time corresponding to a fingerprint image in the plurality of fingerprint images having a pixel value equal to a first preset pixel value as an exposure time of the first light environment; and where establishing the correspondence between the light information and the operating parameter of each of the light environments, includes: establishing a correspondence between the light information of the first light environment and the exposure time.

The preset exposure time can be set as any duration, such as 10 ms, criteria of setting the preset exposure time may be that for any light environment in the plurality of the light environments, the pixel value of the initial fingerprint image of the test fingerprint acquired by using the preset exposure time is less than or equal to a second preset pixel value.

It should be understood that the initial fingerprint image of the test fingerprint may be an entire fingerprint image of the test fingerprint, also may be an image of a partial fingerprint of the test fingerprint.

It should be understood that determining the pixel value of the initial fingerprint image may include: determining the pixel value of each of all the pixel points of the initial fingerprint image, determining an average value of the pixel values of all the pixel points as the pixel value of the initial fingerprint image.

Optionally, in view of the effect of the fingerprint image, the pixel value of the initial fingerprint image may be determined by determining the pixel value of the partial area of the initial fingerprint image. For example, the initial fingerprint image is collected, and a partial area of the initial fingerprint image is selected, for example, the partial area is selected by a related algorithm, and the pixel value of the partial area is calculated as the pixel value of the initial fingerprint image.

With reference to the first aspect and the foregoing implementation manners, in another implementation manner of the first aspect, the first preset pixel value is greater than or equal to 700 and the first preset pixel value is less than or equal to 800.

With reference to the first aspect and the foregoing implementation manners, in another implementation manner of the first aspect, the pixel value of the initial fingerprint image is less than or equal to a second preset pixel value.

With reference to the first aspect and the foregoing implementation manners, in another implementation manner of the first aspect, the second preset pixel value is 1024.

With reference to the first aspect and the foregoing implementation manners, in another implementation manner of the first aspect, the target light information includes luminous intensity and/or brightness of light in the current light environment.

Therefore, in the method for acquiring the fingerprint image according to the embodiment of the present disclosure, target light information of a current light environment of a to-be-identified fingerprint may be determined, for example, the target light information may include a pixel value of a fingerprint image, and the pixel value of the fingerprint image may be the pixel value of the fingerprint image of the to-be-identified fingerprint acquired according to a preset exposure time, so that a target operating parameter corresponding to the target light information is determined; a fingerprint image of the to-be-identified fingerprint is acquired according to the target operating parameter so as to execute a fingerprint image identification. In this way, the operating parameter for acquiring the fingerprint image of the to-be-identified fingerprint can be dynamically adjusted according to different light environments, the operating parameters may be any parameter in the process of acquiring the fingerprint image and performing the fingerprint identification, for example, the operating parameter may be an exposure time, so that an intended result of using an optical fingerprint in different environments is achieved without increasing hardware cost.

According to a second aspect, an apparatus for acquiring a fingerprint image is provided, the apparatus includes a light source device and an optical fingerprint module, the optical fingerprint module is configured to perform a fingerprint identification on a to-be-identified fingerprint; the light source device is configured to provide a light source for a process of the fingerprint identification performed by the optical fingerprint module; and the optical fingerprint module is further configured to execute the method in the foregoing first aspect or any one of the possible implementation manners of the first aspect.

According to a third aspect, a terminal device is provided, the terminal device includes a self-luminous display panel and an optical fingerprint module, the optical fingerprint module is located below the self-luminous display panel, the optical fingerprint module is configured to execute the method in the foregoing first aspect or any one of the possible implementation manners of the first aspect; and the self-luminous display panel is configured to provide a light source for the optical fingerprint module.

With reference to the third aspect, in an implementation manner of the third aspect, the terminal device is the apparatus for acquiring the fingerprint image of the foregoing second aspect, the self-luminous display panel in the terminal device is the light source device in the apparatus of the foregoing second aspect, and the optical fingerprint module in the terminal device is the optical fingerprint module in the apparatus of the foregoing second aspect.

DESCRIPTION OF EMBODIMENTS

The following describes technical solutions in embodiments of the present disclosure with reference to the accompanying drawings.

Figure 1:
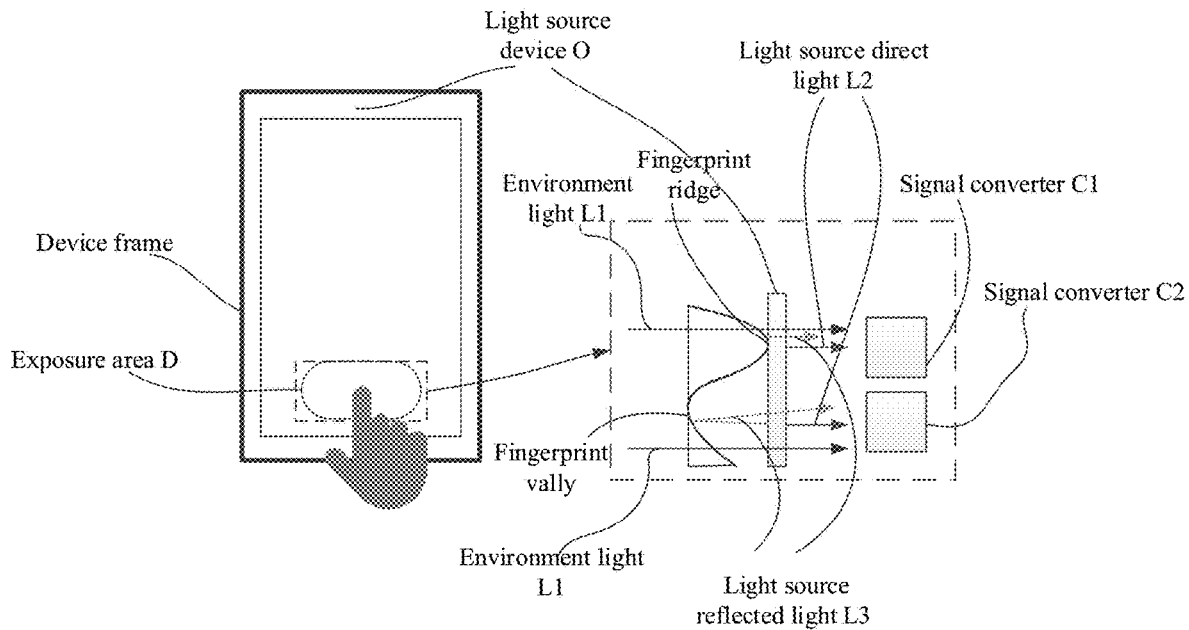
FIG. 1 is a schematic diagram of a terminal device according to an embodiment of the present disclosure.

It should be understood that FIG. 1 shows a schematic diagram of a terminal device according to an embodiment of the present disclosure. The terminal device may include, but is not limited to, a mobile terminal, a mobile telephone, a user equipment (UE), a handset, portable equipment, and the like, for example, the terminal device may be the mobile telephone.

As shown in FIG. 1, the terminal device includes an optical fingerprint module and a panel, the optical fingerprint module is configured for performing an optical fingerprint identification. The optical fingerprint module may be provided below the panel. The panel may be a touch display screen of the terminal device, may be configured to display an image for a user and may also be configured to provide a light source when the optical fingerprint module of the terminal device performs the fingerprint identification. The optical fingerprint module may include a fingerprint chip for the fingerprint identification, and may also include an optical fingerprint sensor.

It should to be understood that the panel of the terminal device may be a display screen having light emitting display pixels without the use of backlight, each pixel generates light for forming a display image on the screen; for example, the panel may be an organic light-emitting diode (OLED) display screen or an electroluminescent display screen. Specifically, the panel of the terminal device may be considered as a light source device, and the light source device may include a plurality of self-luminous display units, for example, the self-luminous display units may be the light emitting display pixels. As shown in FIG. 1, a light source device O may be configured to display an image for the user, so that the user can operate the terminal device according to the display image. In addition, the light source device O may also be configured to provide the light source for acquiring a fingerprint image of a to-be-identified fingerprint; that is, in a process of the fingerprint identification, the light source device O is configured to illuminate the to-be-identified fingerprint, so as to acquire the fingerprint image of the to-be-identified fingerprint to perform the fingerprint identification. For example, in FIG. 1, a light source direct light L2 is generated by the light source device O for illuminating the to-be-identified fingerprint, that is, the light source direct light L2 provides the light source for acquiring the fingerprint image of the to-be-identified fingerprint.

In addition, an exposure area D may be included on the panel, and the exposure area D may be configured to collect the fingerprint image of the to-be-identified fingerprint to perform the fingerprint identification. Optionally, the optical fingerprint module of the terminal device may be located in the exposure area D, that is, when the user performs the fingerprint identification, a finger presses the area, to cover the to-be-identified fingerprint on the exposure area D; the fingerprint image of the to-be-identified fingerprint is acquired and identified through the optical fingerprint module in the exposure area D.

It should be understood that the optical fingerprint module included in the terminal device may include an optical fingerprint sensor, and the optical fingerprint sensor may include a photo-diode (PD) array. The PD array may be considered to include a plurality of signal converters, for example, a signal converter C1 and a signal converter C2 as shown in FIG. 1 are any two of the signal converters in the PD array. Specifically, the optical fingerprint sensor is configured to collect fingerprint data of the to-be-identified fingerprint. The signal converter C1 and the signal converter C2 in FIG. 1 are taken as an example, the signal converter C1 and the signal converter C2 may be configured to convert an input light signal into a digital signal. For example, the light source direct light L2 irradiates the to-be-identified fingerprint of the user's finger, and the light source direct light L2 is reflected to form a reflected light L3, and the signal converter C1 and the signal converter C2 may convert a light signal of the reflected light L3 which is reflected by the to-be-identified fingerprint and collected by the signal converter C1 and the signal converter C2, into a digital signal, thereby acquiring the fingerprint image so as to identify the fingerprint image.

In an embodiment of the present disclosure, as shown in FIG. 1, the light source device O of the terminal device provides the light source direct light L2, the reflected light L3 is acquired after the light source direct light L2 is reflected by a fingerprint ridge and fingerprint valley of the to-be-identified fingerprint. Since the fingerprint ridge is closer to the light source device than the fingerprint valley, the fingerprint ridge has a stronger reflected light. The collected light signal is then converted into data information through the signal converter, a difference of the reflected light may be represented as a difference in the fingerprint image, that is, the fingerprint image corresponding to the to-be-identified fingerprint may be acquired. However, since a light environment of the to-be-identified fingerprint has an environment light L1 with uncontrollable intensity (such as an intensity of sunlight), the reflected light reflected by the fingerprint may be affected by the environment light, the embodiment of the present disclosure proposes a method for acquiring a fingerprint image; when the fingerprint image of the to-be-identified fingerprint is collected, an operating parameter such as an exposure time and the like may be dynamically adjusted, thereby reducing an influence of the environment light on the fingerprint collecting in a fingerprint detection process.

Figure 2:
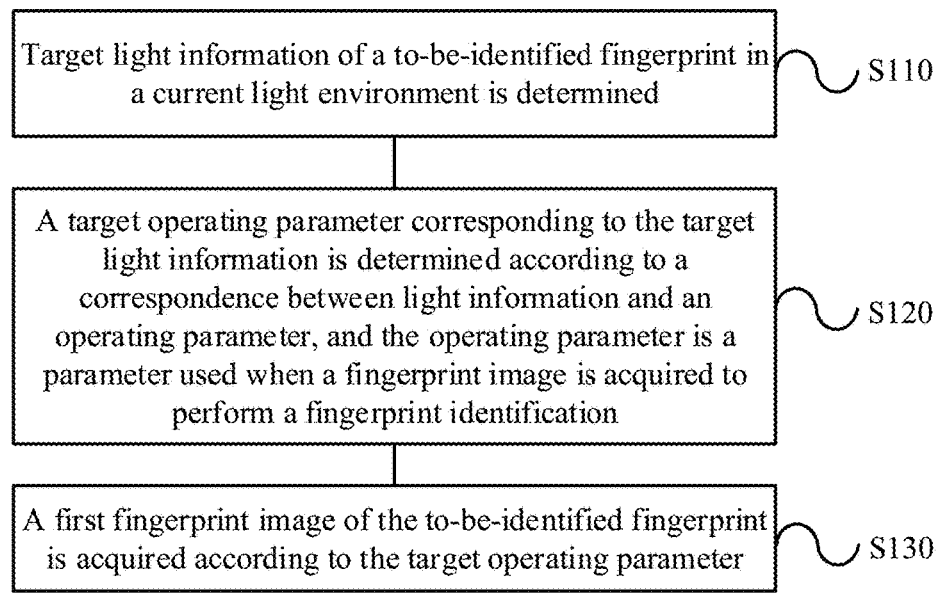
FIG. 2 is a schematic flowchart of a method for acquiring a fingerprint image according to an embodiment of the present disclosure.

Specifically, FIG. 2 shows a schematic flowchart of a method 100 for acquiring a fingerprint image according to an embodiment of the present disclosure. The method 100 may be executed by an apparatus for acquiring the fingerprint image, and the apparatus for acquiring the fingerprint image may be an optical fingerprint module. For example, the method 100 may be used by a terminal device as shown in FIG. 1, and in particular, the method 100 may be executed by the optical fingerprint module in the terminal device, and the optical fingerprint module may be arranged in an exposure area D of the terminal device as shown in FIG. 1.

Specifically, the method 100 includes the following steps: S110, target light information of a current light environment of a to-be-identified fingerprint is determined; S120, a target operating parameter corresponding to the target light information is determined according to a correspondence between light information and operating parameters, and the operating parameter is a parameter used when a fingerprint image is acquired to perform a fingerprint identification; and S130, a first fingerprint image of the to-be-identified fingerprint is acquired according to the target operating parameter.

Therefore, in the method for acquiring the fingerprint image according to the embodiment of the present disclosure, a corresponding operating parameter may be determined according to light information of a light environment of a to-be-identified fingerprint, and a fingerprint image of the to-be-identified fingerprint is acquired according to the operating parameter, to facilitate implementation of a fingerprint image identification. In this way, the operating parameter for acquiring the fingerprint image of the to-be-identified fingerprint may be dynamically adjusted according to different light environments, so that an intended result of using an optical fingerprint in different environments is achieved without increasing hardware cost.

In S110, target light information of a current light environment in which the to-be-identified fingerprint is currently located is determined, and the target light information may characterize an intensity of the light in the current light environment in which the to-be-identified fingerprint is currently located. It should be understood that, for any light environment, the light environment may include one or more types of light, taking a scenario of performing a fingerprint identification on the to-be-identified fingerprint as an example, the current light environment of the to-be-identified fingerprint may include ambient natural light, such as sunlight when the fingerprint identification is performed outdoors; in addition, the light environment may also include the light from the screen of the terminal device that executes the fingerprint identification operation, such as the light source direct light L2 emitted by the light source device O as shown in FIG. 1, which may be used to illuminate the to-be-identified fingerprint to acquire a clearer fingerprint image for the fingerprint identification.

It should be understood that, for any light environment, the light in the light environment may be characterized by light information; specifically, the light information may include at least one of intensity, brightness and luminance of the light in the light environment, or the light information may also include other parameters that characterize the light. Specifically, the scenario of performing the fingerprint identification on the to-be-identified fingerprint is taken as an example, target light information for characterizing the light in the current light environment may be acquired, and the target light information may include at least one of the intensity, brightness and luminance of the light acquired by detecting the current light environment, or may also include other parameters.

For example, before fingerprint identification is performed on the to-be-identified fingerprint, an image in the current light environment is firstly collected, the image is a non-fingerprint image. A pixel value of the image is calculated, and the light in the current light environment is characterized by the pixel value of the image; in other words, the target light information includes the pixel value of the image, and then a process of acquiring and identifying the fingerprint image of the to-be-identified fingerprint is further performed according to the target light information.

As a further example, when fingerprint identification is performed on the to-be-identified fingerprint, the to-be-identified fingerprint presses a collecting area, for example, the to-be-identified fingerprint presses the exposure area D as shown in FIG. 1. By collecting any fingerprint image of the to-be-identified fingerprint, which is referred to as a second fingerprint image, a pixel value of the second fingerprint image may be calculated and the light in the light environment of the to-be-identified fingerprint is characterized by the pixel value of the second fingerprint image, that is, the target light information includes the pixel value of the second fingerprint image. The process of the fingerprint identification of the to-be-identified fingerprint is further performed based on the target light information including the pixel value of the second fingerprint image. Optionally, a fingerprint image of the to-be-identified fingerprint can be re-collected in the fingerprint identification process, the embodiment of the present disclosure is not limited thereto.

In the embodiment of the present disclosure, when a target light information includes at least one of the intensity, brightness and luminance of the light of the current light environment, it can be collected and calculated by various techniques or algorithms, which is not repeatedly described here.

Optionally, in the embodiment of the present disclosure, the target light information including the pixel value of the second fingerprint image of the to-be-identified fingerprint will be illustrated as an example, that is, the target light information corresponding to the current light environment of the to-be-identified fingerprint includes the pixel value of the second fingerprint image of the to-be-identified fingerprint. Specifically, in the current light environment of the to-be-identified fingerprint, the fingerprint presses the collecting area (such as the exposure area D as shown in FIG. 1), and according to a preset exposure time, the second fingerprint image of the to-be-identified fingerprint is acquired, and then the pixel value of the second fingerprint image is calculated; the target light information includes the pixel value of the second fingerprint image.

It should be understood that the preset exposure time can be set as any duration in practice, such as 10 ms; criteria of setting the preset exposure time may be that the pixel value of the second fingerprint image is less than or equal to a second preset pixel value. The second preset pixel value can be set as required, for example, the second preset pixel value may be set as 1024, and correspondingly the preset exposure time may be set, to ensure the pixel value of the second fingerprint image less than or equal to 1024, that is, the pixel points of the second fingerprint image are not saturated.

It should be understood that the second fingerprint image of the to-be-identified fingerprint may be an entire fingerprint image of the to-be-identified fingerprint, or may be a partial fingerprint image of the to-be-identified fingerprint. Specifically, the to-be-identified fingerprint contacts the collecting area, such as the exposure area D as shown in FIG. 1, the fingerprint module may collect the fingerprint image in the whole contact area as the second fingerprint image; or, the fingerprint module may collect the fingerprint image in a partial contact area as the second fingerprint image. For example, the fingerprint image corresponding to a preset size area of a center area may be collected as the second fingerprint image, but the embodiment of the present disclosure is not limited thereto.

It should be understood that determining the pixel value of the second fingerprint image may include: determining a pixel value of each of all the pixel points of the second fingerprint image, determining an average value of pixel values of all the pixel points as the pixel value of the second fingerprint image. Alternatively, the pixel value of the second fingerprint image may be calculated by another algorithm, but the embodiment of the present disclosure is not limited thereto.

Optionally, in view of the effect of the second fingerprint image, the pixel value of the second fingerprint image may be determined by determining a pixel value of a partial area of the second fingerprint image. For example, the second fingerprint image is collected, and then a partial area of the second fingerprint image is selected, for example, the partial area having a better effect is selected by a related algorithm, and the pixel value of the partial area is calculated as the pixel value of the second fingerprint image, but the embodiment of the present disclosure is not limited thereto.

Similarly, the target light information corresponding to the current light environment of the to-be-identified fingerprint may include other parameters such as the pixel value of an image in the current light environment; the image is not a fingerprint image, however, a process for acquiring and calculating the pixel value of the image may be similar to that of the second fingerprint image of the to-be-identified fingerprint, which is not repeatedly described here.

In S120, a target operating parameter corresponding to the target light information is determined according to a correspondence between light information and operating parameters, the operating parameter is a parameter used when a fingerprint image is acquired to perform a fingerprint identification. Specifically, the operating parameter may refer to various parameters that may be involved in the fingerprint identification process, such as the exposure time used when the fingerprint image of the to-be-identified fingerprint is collected by the light fingerprint module, an intensity of the light provided for the to-be-identified fingerprint by the light source device of the optical fingerprint identification device of the terminal device, or an area size of the fingerprint image of the to-be-identified fingerprint collected by the fingerprint module.

In an embodiment of the present disclosure, a correspondence between light information and operating parameters corresponding to various light environments may be stored in a light fingerprint identification device such as a terminal device. For example, the correspondence between the light information and the operating parameters may be stored in a storage member of the terminal device, or the correspondence between the light information and the operating parameters is stored in the light fingerprint module in the terminal device. The corresponding target operating parameter may be determined according to the target light information.

It should be understood that the method 100 further includes: determining light information and a corresponding operating parameter of each of a plurality of light environments, and establishing a correspondence between the light information and the operating parameter of each of the light environments. It should be understood that the plurality of light environments are to stimulate different intensities of the lights in the light environments in which the user may be located when implementing the fingerprint identification. In addition, for ease of description, a first light environment will be illustrated as an example, and the first light environment is any one of the plurality of light environments.

In the embodiment of the present disclosure, light information corresponding to the first light environment is determined, the light information may include at least one of the intensity, the brightness and the luminance of the light in the first light environment, or may include other parameters that characterize the light in the first light environment. For example, an image of the first light environment is collected, the image is a non-fingerprint image; and then the pixel value of the image is calculated, and the light in the first light environment is characterized by the pixel value of the image, that is, the light information corresponding to the first environment includes the pixel value of the image. As a further example, a fingerprint is set as a test fingerprint, and a pixel value of an initial fingerprint image is calculated by collecting the initial fingerprint image of the test fingerprint; the light information of the first light environment includes the pixel value of the initial fingerprint image.

It should be understood that when determining the first light environment, a light source device in an optical fingerprint identification device such as a terminal device may emit light or may not emit light. If the light source device emits light, the light in the first light environment simulates the light including the natural light of the external environment and the light of the light source device; and if the light source device does not emit light, the first light environment merely simulates an influence of the natural light of the external environment in a fingerprint detection.

Optionally, if the light source device does not emit the light when determining the light information of the plurality of the light environment, the light source device does not emit the light either when determining the target light information of the to-be-identified fingerprint; similarly, if the light source device emits the light when determining the light information of the plurality of the light environment, the light source device also emits the light when determining the target light information of the to-be-identified fingerprint, but the embodiment of the present disclosure is not limited thereto.

It should be understood that, for the correspondence between the light information and the operating parameters of the plurality of the light environments, a parameter type included in the light information is relevant to a parameter in the target light information corresponding to the to-be-identified fingerprint, for example, the parameter in the target light information corresponding to the to-be-identified fingerprint may be included in the light information. For example, when the light information of the light environment stored in the terminal device includes brightness and luminance, the determined target light information of the current light environment of the to-be-identified fingerprint may also include brightness and/or luminance. As a further example, when the light information of the light environment stored in the terminal device merely includes a pixel value of an image, such as a pixel value of an initial fingerprint image of a test fingerprint, the determined target light information of the current light environment of the to-be-identified fingerprint includes a pixel value of a fingerprint image of the to-be-identified fingerprint.

The light information corresponding to various light environments including a pixel value of an initial fingerprint image of a test fingerprint will be illustrated as an example, specifically, the light information of the first light environment is taken as an example, and accordingly, the target light information acquired in S110 includes the pixel value of the second fingerprint image of the to-be-identified fingerprint.

Specifically, in the first light environment, the initial fingerprint image of the test fingerprint is collected according to the preset exposure time, the pixel value of the initial fingerprint image is calculated, and the light information of the first light environment includes the pixel value of the initial fingerprint image.

It should be understood that the preset exposure time can be set as any duration in practice, such as 10 ms; criteria of setting the preset exposure time may be that for any light environment in the plurality of the light environments, a pixel value of a fingerprint image acquired by using the preset exposure time is less than or equal to a second preset pixel value. For example, the second preset pixel value may be set as 1024, that is, a pixel point of each of the fingerprint images is not saturated, and in other words, the exposure time in which the pixel value of each of images acquired in any light environment is less than 1024 is the preset exposure time. After the preset exposure time is determined, the second fingerprint image is acquired using the same preset exposure time when the second fingerprint image of the to-be-identified fingerprint is acquired in S110.

It should be understood that the initial fingerprint image of the test fingerprint may be an entire fingerprint image of the test fingerprint, or may be a partial fingerprint image of the test fingerprint. Accordingly, when the second fingerprint image of the to-be-identified fingerprint is acquired in S110, a collecting area of the second fingerprint image coincides with a collecting area of the initial fingerprint image.

It should be understood that determining the pixel value of the initial fingerprint image may include: determining the pixel value of each of all the pixel points of the initial fingerprint image, determining an average value of pixel values of all the pixel points as the pixel value of the initial fingerprint image. Alternatively, the pixel value of the initial fingerprint image may be calculated by another algorithm, but the embodiment of the present disclosure is not limited thereto.

Optionally, in view of the effect of the fingerprint image, the pixel value of the initial fingerprint image may be determined by determining the pixel value of a partial area of the initial fingerprint image. For example, the initial fingerprint image is collected, and then a partial area of the initial fingerprint image is selected, for example, the partial area is selected by the related algorithm, and the pixel value of the partial area is calculated as the pixel value of the initial fingerprint image, but the embodiment of the present disclosure is not limited thereto.

Accordingly, after the second fingerprint image of the to-be-identified fingerprint is acquired in S110, the pixel value of the second fingerprint image is determined using the same algorithm.

It should be understood that the light information of the first light environment is determined, the light information includes the pixel value of the initial fingerprint image, and similarly, the light information of each light environment is determined by using a similar algorithm for each of the plurality of light environments.

In the embodiment of the present disclosure, after the light information of each light environment is determined, the operating parameter corresponding to each of the light information is determined, and the operating parameter may be an optimum operating parameter in the corresponding light environment, that is, the operating parameter may ensure a preferable effect to be achieved in the fingerprint identification process of the to-be-identified fingerprint. Here, the operating parameter including exposure time of collecting the fingerprint image will be illustrated as an example, that is, the exposure time corresponding to the light information of each light environment is determined, the exposure time may be an optimum exposure time, and a correspondence between the light information of each light environment and the optimum exposure time is established.

Optionally, determining an optimum exposure time of the first light environment is taken as an example. Specifically, in the first light environment, a plurality of fingerprint images of the test fingerprint are respectively acquired using different exposure times, and a pixel value of each fingerprint image is determined. When the pixel value of one of the plurality of fingerprint images satisfies a preset condition, the exposure time corresponding to the fingerprint image is determined as the optimum exposure time of the first light environment, and the correspondence between the light information of the first light environment and the exposure time is established.

It should be understood that the plurality of fingerprint images corresponding to different exposure times are acquired in the first light environment, and the pixel value of each fingerprint image is calculated using the same algorithm.

It should be understood that the preset condition may be that the pixel value of the fingerprint image is less than or equal to the first preset pixel value, the first preset pixel value may be set according to a clarity of the image. For example, in order to enable the acquired fingerprint image to reach a clearest state, the first preset pixel value may be set within a range of [700,800].

It should be understood that the exposure time in each light environment is determined according to the manner for determining the exposure time of the first light environment, and the correspondence between the light information and the exposure time of the plurality of light environments may be established. After the target light information corresponding to the current light environment of the to-be-identified fingerprint is determined, the exposure time corresponding to the target light information may be determined according to the correspondence between the light information and the exposure time. Generally, if the light environment of the to-be-identified fingerprint is strong, the corresponding exposure time is short, and if the light environment of the to-be-identified fingerprint is weak, the corresponding exposure time is long.

In the embodiment of the present disclosure, similarly, the correspondence between the light information and the operating parameters of the plurality of light environments may also be established; for example, the correspondence between the light information and the optimum exposure time of the plurality of light environments is established. As such, the target operating parameter corresponding to the target light information of the to-be-identified fingerprint can be determined according to the correspondence after the target light information of the to-be-identified fingerprint is acquired. For example, the target exposure time corresponding to the target light information of the to-be-identified fingerprint is acquired.

In S130, a first fingerprint image of the to-be-identified fingerprint is acquired according to the target operating parameter, the first fingerprint image can be used for fingerprint identification. Specifically, the fingerprint identification can be performed by means of the conventional optical fingerprint identification, for example, the first fingerprint image can be acquired by collecting an entire image in the exposure area D contacted by the to-be-identified fingerprint, or, be acquired by collecting a partial image. As a further example, the acquired first fingerprint image may be directly restored to fingerprint image data to perform fingerprint identification; alternatively, fingerprint data can be acquired by another calculation process to perform the fingerprint identification, but the embodiment of the present disclosure is not limited thereto.

It should be understood that the first fingerprint image of the to-be-identified fingerprint is acquired according to the target operating parameter, in this case, a light source device of an optical fingerprint identification device provides a light source for the acquisition and identification process of the fingerprint module, for example, the light source device O of the terminal device as shown in FIG. 1 provides the light source for the to-be-identified fingerprint.

It should be understood that the target operating parameter may include any parameter involved in the process of collecting and identifying the first fingerprint image of the to-be-identified fingerprint. For example, the target operating parameter may include the target exposure time, and the target exposure time may be used for collecting the first fingerprint image of the to-be-identified fingerprint; the to-be-identified fingerprint contacts the collecting area, such as the exposure area D shown in FIG. 1, and the collecting area is exposed by using the target exposure time, thereby acquiring the first fingerprint image.

Therefore, in the method for acquiring the fingerprint image according to the embodiment of the present disclosure, target light information of a light environment of a to-be-identified fingerprint may be determined, for example, the target light information may include a pixel value of a fingerprint image, and the pixel value of the fingerprint image may be the pixel value of the fingerprint image of the to-be-identified fingerprint acquired according to a preset exposure time, thereby determining a target operating parameter corresponding to the target light information. A fingerprint image of the to-be-identified fingerprint is acquired according to the target operating parameter, so as to execute a fingerprint image authentication and identification. In this way, the operating parameter, such as the exposure time, for acquiring the fingerprint image of the to-be-identified fingerprint can be dynamically adjusted according to different light environments, so that an intended result of using an optical fingerprint in different environments is achieved without increasing hardware cost.

It should be understood that in the various embodiments of the present disclosure, sequence numbers of the foregoing processes do not mean the execution sequence, and the sequence of executing the respective processes should be determined in terms of their functions and intrinsic logic, and shall not limit the embodiment of the present disclosure in any way.

The method for acquiring the fingerprint image according to the embodiment of the present disclosure has been described above in detail with reference to FIGS. 1 to 2, and an apparatus for acquiring a fingerprint image according to an embodiment of the present disclosure will be described below in detail with reference to FIG. 3.

Figure 3:
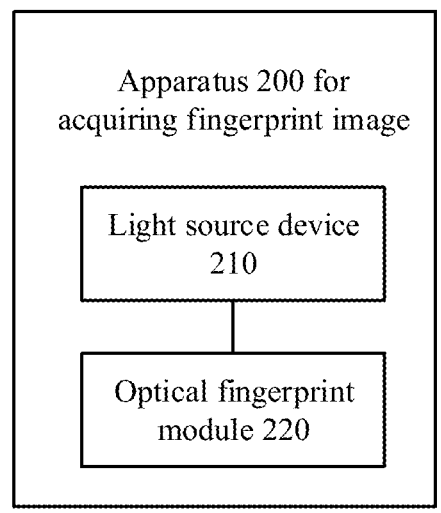
FIG. 3 is a schematic block diagram of an apparatus for acquiring a fingerprint image according to an embodiment of the present disclosure.

As shown in FIG. 3, an apparatus 200 for acquiring a fingerprint image according to an embodiment of the present disclosure includes: a light source device 210 and an optical fingerprint module 220, where the optical fingerprint module 220 is configured to perform a fingerprint identification on a to-be-identified fingerprint; the light source device 210 is configured to provide a light source for a process of the fingerprint identification performed by the optical fingerprint module 220.

Specifically, the optical fingerprint module 220 is further configured to: determine target light information of a current light environment of a to-be-identified fingerprint; determine a target operating parameter corresponding to the target light information according to a correspondence between light information and operating parameters, the operating parameter being a parameter used when a fingerprint image is acquired to perform a fingerprint identification; and acquire a first fingerprint image of the to-be-identified fingerprint according to the target operating parameter.

Therefore, according to the apparatus for acquiring the fingerprint image of the embodiment of the present disclosure, a corresponding operating parameter may be determined according to light information of a current light environment of a to-be-identified fingerprint, and a fingerprint image of the to-be-identified fingerprint is acquired according to the operating parameter so as to execute the fingerprint image identification. In this way, the operating parameter for acquiring the fingerprint image of the to-be-identified fingerprint can be dynamically adjusted according to different light environments, so that an intended result of using an optical fingerprint in different environments is achieved without increasing hardware cost.

Optionally, the optical fingerprint module 220 is configured to: in the current light environment, acquire a second fingerprint image of the to-be-identified fingerprint according to a preset exposure time; determine a pixel value of the second fingerprint image; and determine the light information, the light information including the pixel value of the second fingerprint image.

Optionally, the optical fingerprint module 220 is configured to: determine pixel values of all pixel points in the second fingerprint image; and determine an average pixel value of all the pixel points as the pixel value of the second fingerprint image.

Optionally, the optical fingerprint module 220 is configured to: acquire an image of a partial fingerprint of the to-be-identified fingerprint as the second fingerprint image.

Optionally, the optical fingerprint module 220 is further configured to: determine light information and a corresponding operating parameter of each of a plurality of light environments; and establish a correspondence between the light information and the operating parameter of each of the light environments.

Optionally, the operating parameter includes an exposure time and the target operating parameter includes a target exposure time.

Optionally, the optical fingerprint module 220 is configured to: in a first light environment of a plurality of light environments, determine a pixel value of an initial fingerprint image of a test fingerprint according to a preset exposure time; determine light information of the first light environment, the light information of the first light environment including the pixel value of the initial fingerprint image; in the first light environment, determine corresponding pixel values of a plurality of fingerprint images of the test fingerprint according to different exposure times; determine an exposure time corresponding to a fingerprint image in the plurality of fingerprint images having a pixel value equal to a first preset pixel value as an exposure time of the first light environment; and establish a correspondence between the light information of the first light environment and the exposure time.

Optionally, the first preset pixel value is greater than or equal to 700 and the first preset pixel value is less than or equal to 800.

Optionally, the pixel value of the initial fingerprint image is less than or equal to a second preset pixel value.

Optionally, the second preset pixel value is 1024.

Optionally, the target light information includes luminous intensity and/or brightness of light in the current light environment.

It should be understood that the apparatus 200 for acquiring the fingerprint image according to the embodiment of the present disclosure may correspond to the method 100 for the execution in the embodiment of the present disclosure, the foregoing and other operations and/or functions of the respective units in the apparatus 200 for acquiring the fingerprint image are receptively to implement the corresponding flow of the various methods in FIG. 2, which is not repeatedly described here for brevity.

It should be understood that the apparatus 200 for acquiring the fingerprint image according to the embodiment of the present disclosure may correspond to the terminal device as shown in FIG. 1. Specifically, the terminal device as shown in FIG. 1 may include the apparatus 200, or the terminal device may be the apparatus 200. The light source device O included in the terminal device corresponds to the light source device 210 in the apparatus 200, and the optical fingerprint module in the terminal device corresponds to the optical fingerprint module 220 in the apparatus 200.

Optionally, as shown in FIG. 1, the light source device O in the terminal device may be a self-luminous display panel, the optical fingerprint module of the terminal device may be located below the self-luminous display panel, for example, the optical fingerprint module may be located at the exposure area D, and the embodiment of the present disclosure is not limited thereto.

Therefore, according to the apparatus for acquiring the fingerprint image in the embodiment of the present disclosure, target light information of a light environment of a to-be-identified fingerprint may be determined, for example, the target light information may include a pixel value of a fingerprint image, and the pixel value of the fingerprint image may be the pixel value of the fingerprint image of the to-be-identified fingerprint acquired according to a preset exposure time, thereby determining a target operating parameter corresponding to the target light information; a fingerprint image of the to-be-identified fingerprint is acquired according to the target operating parameter so as to execute a fingerprint image identification. In this way, the operating parameter for acquiring the fingerprint image of the to-be-identified fingerprint can be dynamically adjusted according to different light environments, the operating parameters may be any parameter in the process of acquiring the fingerprint image and performing the fingerprint identification, for example, the operating parameter may be an exposure time, so that an intended result of using an optical fingerprint in different environments is achieved without increasing hardware cost.

Persons of ordinary skill in the art may be aware that, the exemplary units and algorithm steps described in combination with the embodiments disclosed here can be implemented by electronic hardware or a combination of computer software and electronic hardware. Whether the functions are executed in a manner of hardware or software depends on a particular application and a design constraint condition of the technical solutions. Persons skilled in the art may use different methods to implement the described functions for every particular application, but it should not be considered that such implementation goes beyond the scope of the present disclosure.

Persons skilled in the art may clearly understand that, for convenience and brevity of description, reference may be made to the corresponding procedure in the foregoing method embodiments for a detailed working procedure of the foregoing system, apparatus and unit, which is not repeatedly described here.

In the several embodiments provided in the present disclosure, it should be understood that the disclosed system, apparatus, and method may be implemented in other manners. For example, the foregoing described apparatus embodiments are merely exemplary. For example, division of the units is merely logical function division and there may be other division manners in practical implementation. For example, multiple units or components may be combined or integrated into another system, or some features may be ignored or not executed. In addition, the displayed or discussed mutual coupling or direct coupling or communication connection may be indirect coupling or communication connection through some interfaces, apparatuses or units, and may also be electrical, mechanical, or connection in other forms.

The units described as separate parts may or may not be physically separate, and parts displayed as units may or may not be physical units, may be located in one position, or may be distributed on multiple network units. Part of or all of the units here may be selected according to a practical need to achieve the objectives of the solutions of the embodiments.

In addition, functional units in the embodiments of the present disclosure may be integrated into a processing unit, or each unit may exist alone physically, or two or more than two units may be integrated into one unit.

If being implemented in the form of a software functional unit and sold or used as a separate product, the integrated unit may be stored in a computer-readable storage medium. Based on such understanding, the nature of the technical solutions of the present disclosure, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present disclosure. The foregoing storage medium includes: various media that may store program codes, such as a U-disk, a removable hard disk, a read-only memory (ROM), a random access memory (RAM), a magnetic disk, a compact disk, and so on.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method for acquiring a fingerprint image, comprising:
   determining target light information of a current light environment of a to-be-identified fingerprint;
   determining a target operating parameter corresponding to the target light information according to a correspondence between light information and operating parameters, the operating parameter being a parameter used when a fingerprint image is acquired to perform a fingerprint identification, wherein the operating parameter comprises an exposure time and the target operating parameter comprises a target exposure time; and
   acquiring a first fingerprint image of the to-be-identified fingerprint according to the target operating parameter;
   wherein the method further comprises:
   determining light information and a corresponding operating parameter of each of a plurality of light environments; and
   establishing a correspondence between the light information and the operating parameter of each of the light environments;
   wherein determining the light information and the corresponding operating parameter of each of the plurality of light environments, comprises:
   in a first light environment of the plurality of light environments, determining a pixel value of an initial fingerprint image of a test fingerprint according to a preset exposure time;
   determining light information of the first light environment, the light information of the first light environment comprising the pixel value of the initial fingerprint image;
   in the first light environment, determining corresponding pixel values of a plurality of fingerprint images of the test fingerprint according to different exposure times;
   determining an exposure time corresponding to a fingerprint image in the plurality of fingerprint images having a pixel value equal to a first preset pixel value as an exposure time of the first light environment; and
   wherein establishing the correspondence between the light information and the operating parameter of each of the light environments, comprises:
   establishing a correspondence between the light information of the first light environment and the exposure time.

2. The method according to claim 1, wherein determining the target light information of the current light environment of the to-be-identified fingerprint, comprises:
   in the current light environment, acquiring a second fingerprint image of the to-be-identified fingerprint according to a preset exposure time;
   determining a pixel value of the second fingerprint image; and
   determining the target light information, the target light information comprising the pixel value of the second fingerprint image.

3. The method according to claim 2, wherein determining the pixel value of the second fingerprint image, comprises:
   determining pixel values of all pixel points in the second fingerprint image; and
   determining an average pixel value of all the pixel points as the pixel value of the second fingerprint image.

4. The method according to claim 2, wherein acquiring the second fingerprint image of the to-be-identified fingerprint, comprises:
   acquiring an image of a partial fingerprint of the to-be-identified fingerprint as the second fingerprint image.

5. The method according to claim 1, wherein the first preset pixel value is greater than or equal to 700 and the first preset pixel value is less than or equal to 800.

6. The method according to claim 1, wherein the pixel value of the initial fingerprint image is less than or equal to a second preset pixel value.

7. The method according to claim 6, wherein the second preset pixel value is 1024.

8. The method according to claim 1, wherein the target light information comprises at least one of luminous intensity or brightness of light in the current light environment.

9. An apparatus for acquiring a fingerprint image, comprising: a light source device and an optical fingerprint module,
   the optical fingerprint module configured to perform a fingerprint identification on a to-be-identified fingerprint;
   the light source device configured to provide a light source for a process of the fingerprint identification performed by the optical fingerprint module;
   wherein the optical fingerprint module comprises:
   a processor, configured to:
   determine target light information of a current light environment of the to-be-identified fingerprint, and
   determine a target operating parameter corresponding to the target light information according to a correspondence between light information and operating parameters, the operating parameter being a parameter used when a fingerprint image is acquired to perform a fingerprint identification, wherein the operating parameter comprises an exposure time and the target operating parameter comprises a target exposure time; and
   an optical fingerprint sensor, configured to:
   acquire a first fingerprint image of the to-be-identified fingerprint according to the target operating parameter;
   wherein the processor is further configured to:
   determine light information and a corresponding operating parameter of each of a plurality of light environments; and
   establish a correspondence between the light information and the operating parameter of each of the light environments;
   wherein the optical fingerprint sensor is further configured to:
   in a first light environment of the plurality of light environments, determine a pixel value of an initial fingerprint image of a test fingerprint according to a preset exposure time; and
   the processor is further configured to:
   determine light information of the first light environment, the light information of the first light environment comprising the pixel value of the initial fingerprint image, in the first light environment, determine corresponding pixel values of a plurality of fingerprint images of the test fingerprint according to different exposure times, determine an exposure time corresponding to a fingerprint image in the plurality of fingerprint images having a pixel value equal to a first preset pixel value as an exposure time of the first light environment, and establish a correspondence between the light information of the first light environment and the exposure time.

10. The apparatus according to claim 9, wherein the optical fingerprint sensor is configured to:

in the current light environment, acquire a second fingerprint image of the to-be-identified fingerprint according to a preset exposure time;

the processor is configured to:

determine a pixel value of the second fingerprint image, and determine the target light information, the target light information comprising the pixel value of the second fingerprint image.

11. The apparatus according to claim 10, wherein the optical fingerprint sensor is configured to:

determine pixel values of all pixel points in the second fingerprint image; and determine an average pixel value of all the pixel points as the pixel value of the second fingerprint image.

12. The apparatus according to claim 10, wherein the processor is configured to:

acquire an image of a partial fingerprint of the to-be-identified fingerprint as the second fingerprint image.

13. The apparatus according to claim 9, wherein the target light information comprises at least one of luminous intensity or brightness of light in the current light environment.

14. A terminal device, comprising: a self-luminous display panel and an optical fingerprint module, the optical fingerprint module being located below the self-luminous display panel, the self-luminous display panel configured to provide a light source for the optical fingerprint module; and the optical fingerprint module comprises:

a processor, configured to:

determine target light information of a current light environment of the to-be-identified fingerprint, and determine a target operating parameter corresponding to the target light information according to a correspondence between light information and operating parameters, the operating parameter being a parameter used when a fingerprint image is acquired to perform a fingerprint identification, wherein the operating parameter comprises an exposure time and the target operating parameter comprises a target exposure time; and an optical fingerprint sensor, configured to:

acquire a first fingerprint image of the to-be-identified fingerprint according to the target operating parameter;

wherein the processor is further configured to:

determine light information and a corresponding operating parameter of each of a plurality of light environments; and establish a correspondence between the light information and the operating parameter of each of the light environments;

wherein the optical fingerprint sensor is further configured to:

in a first light environment of the plurality of light environments, determine a pixel value of an initial fingerprint image of a test fingerprint according to a preset exposure time; and the processor is further configured to:

determine light information of the first light environment, the light information of the first light environment comprising the pixel value of the initial fingerprint image, in the first light environment, determine corresponding pixel values of a plurality of fingerprint images of the test fingerprint according to different exposure times, determine an exposure time corresponding to a fingerprint image in the plurality of fingerprint images having a pixel value equal to a first preset pixel value as an exposure time of the first light environment, and establish a correspondence between the light information of the first light environment and the exposure time.

* * * * *